Aug. 23, 1927.

W. F. LAUTENSCHLAGER 1,639,949

GAUGE FOR PERFORATING MACHINES

Filed Jan. 17, 1924

2 Sheets-Sheet 1

Inventor
William F. Lautenschlager
by Francis V. Dakin
Attorney

Aug. 23, 1927.

W. F. LAUTENSCHLAGER 1,639,949

GAUGE FOR PERFORATING MACHINES

Filed Jan. 17, 1924     2 Sheets-Sheet 2

Inventor
William F. Lautenschlager
by Francis V. Dakin
Attorney

Patented Aug. 23, 1927.

1,639,949

UNITED STATES PATENT OFFICE.

WILLIAM F. LAUTENSCHLAGER, OF CINCINNATI, OHIO, ASSIGNOR TO THE PEERLESS MACHINERY COMPANY, OF BOSTON, MASSACHUSETTS, A CORPORATION OF MASSACHUSETTS.

GAUGE FOR PERFORATING MACHINES.

Application filed January 17, 1924. Serial No. 686,817.

This invention relates to a gauge for perforating machines and more particularly to a gauge adapted for use in connection with imitation vamps and similar work.

In the shoe manufacturing industry it has been customary in certain styles of shoes to omit the toe-cap and to provide the vamp with perforating similar to that used on toe-caps, such vamps being commonly known as imitation vamps. In such work it has been customary to use a lineal sweep line design and a centre design, the sweep line design corresponding to that used on the rear edge of the toe-cap. It is very essential that work of this character be placed in exact position in the machine because any inaccuracy in properly locating the perforation on a vamp cannot be remedied.

The principal object of the present invention is the provision of a gauge for use in perforating machines whereby work of the character of imitation vamps may be positioned in the machine rapidly and accurately to the end that the perforated design may be located absolutely in its proper position on the shoe part.

Another object of the invention is to provide a gauge so constructed that it may be applied to or removed from the machine easily and expeditiously and without loss of time.

A further object of the invention is the provision of a gauge so formed that all danger of injury to the hands of the operator is obviated.

An additional object is the provision of a gauge adapted for holding down the ordinary buffer or backer strip of paper which is used in perforating machines adapted to this kind of work for receiving the imprint of the cutting edges of the tube dies.

Other objects of the invention will be more specifically set forth and described hereinafter.

Figure 1:
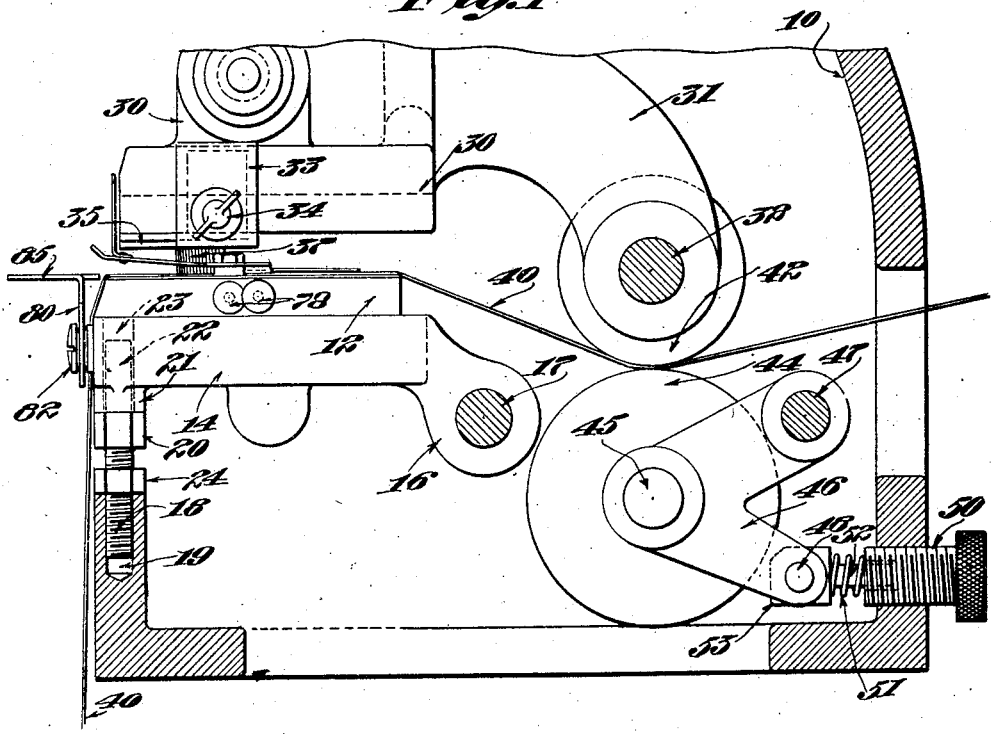
Figure 2:
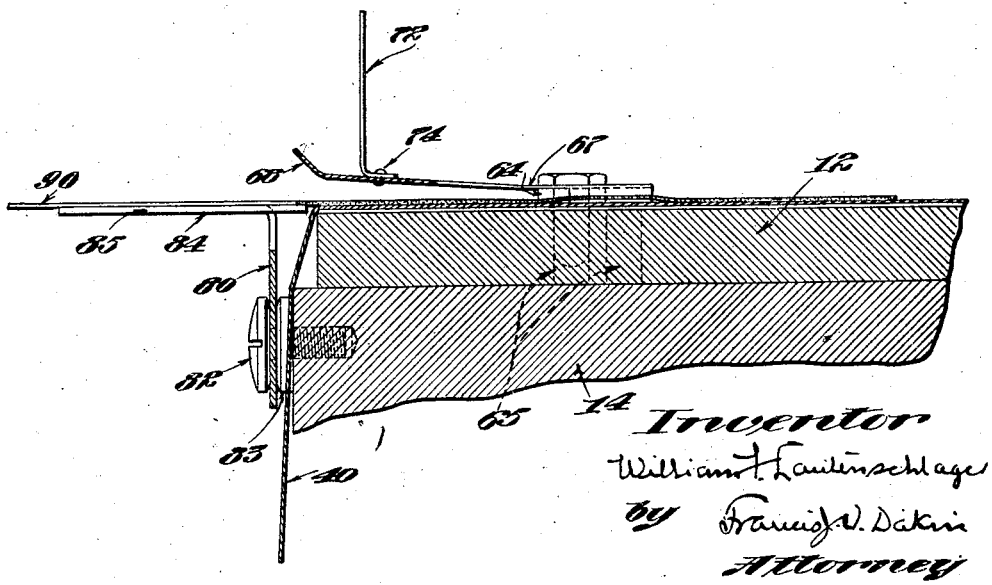
Figure 3:
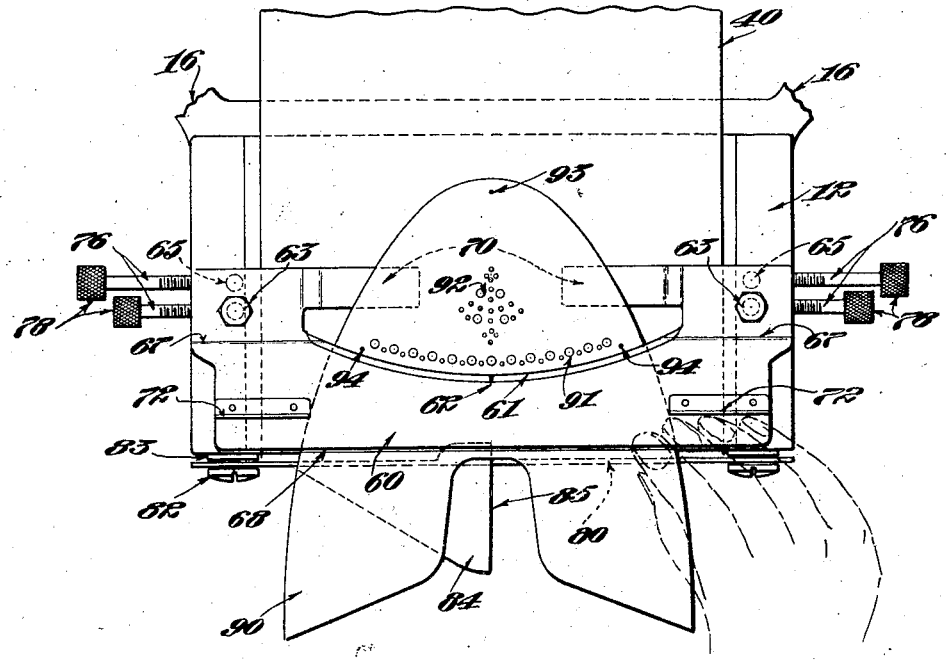
Figure 4:
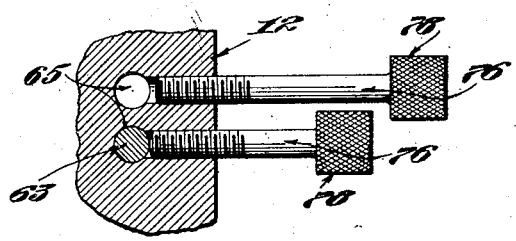

In the drawings illustrating one embodiment of my invention, Figure 1 is a sectional view partly in side elevation of the lower portion of a perforating machine of the general character shown in United States Letters Patent to me No. 1,434,060, dated October 31, 1922, having applied thereto a gauge constructed and adapted to be used in accordance with my invention; Fig. 2 is a cross sectional view on an enlarged scale of the work support of said machine, with the gauge mounted thereon and showing a center guide in elevation; Fig. 3 is a plan view of the work support and gauge with an imitation half vamp placed in the machine and shown as having been perforated; and Fig. 4 is a detailed sectional view of fastening means for holding the gauge in position upon the work support of the machine.

For the purposes of illustration one embodiment of my invention is shown as applied to the perforating machine of the patent to me hereinbefore referred to. Only such parts of that machine are shown, however, as are necessary to explain the present invention and said patent may be referred to for a more detailed description.

Referring to the machine, 10 designates the frame which encloses the mechanism and which is partially open in front toward the operator. A work-support 12 is mounted on a bed-plate 14 provided with two bored ears 16 whereby it is pivotally mounted on a shaft 17 in the frame. In front the bed-plate is supported on two screws 18 threaded into holes 19 in the front plate of the frame. Each screw has a head 20 midway engaging a lug 21 on the bed-plate and is provided with an extension 22 entering a bore 23 in the bed-plate. A nut 24 enables the front of the bed-plate to be vertically adjusted.

Upon a plunger 30, carried by two arms 31, pivotally mounted on a shaft 32, is fastened by end plates 33 and butterfly screws 34 a perforating die 35 of ordinary construction, having a multiplicity of perforating tubes 37 arranged to perforate a design. A paper backer or buffer strip 40 is fed forward over the work-support to protect the cutting edges of the tubes 37 by two co-operating feed rolls 42 and 44, the former mounted on shaft 32 and the latter on a shaft 45 carried by V-shaped arms 46 pivotally mounted on a shaft 47 and connected together at their lower ends by a rod 48. The lower feed-roll 44 is therefore pivotally mounted and is held resiliently against the upper feed-roll 42 by means of a screw-stud 50 threaded through the back of the frame and bearing against a spring 51 mounted on a pin 52 set in a block 53 on the rod 48, the screw-stud being hollow to receive the pin 52.

In the embodiment of the invention shown in the drawings, the gauge comprises a body portion 60 having a curved guiding edge 61 corresponding in curvature to the curve of the sweep line design to be perforated in the work, said edge being provided with central notch 62 for centralizing the work. On each end the gauge is provided with a headed pin 63 held in place by a nut 64 on the under side of the gauge, the two pins being adapted to engage suitable holes 65 in the work support to hold the gauge in place. The work support may have more than one set of holes 65 to permit the gauge to be mounted in various locations to suit different designs. In the drawings two sets of holes are shown, but more may be provided if found necessary. The nuts 64 elevate the body portion of the gauge a sufficient distance above the surface of the work-support to permit the work to be freely inserted under the gauge and to facilitate this the forward portion of the gauge, that is, the portion nearest the operator, may be turned slightly upwardly from the line 67 and then move abruptly at the edge 68. On its inner edge the gauge may have two inwardly extending tongues 70 which may be bent downwardly to hold down the buffer strip 40 and near its forward edge may have at each end an upright guard 72 secured to the gauge by pins 74 to prevent injury to the hands of the operator. Means may be provided for holding the gauge in locked position on the work-support and one form of such means is shown in Figure 4, consisting of sets of screws 76, each being threaded through a bore in the end of the work-support entering one of the holes 65 so that the screw may be turned up against the pin 63 to hold it against displacement and to facilitate manipulation the screw 76 may have a knurled head 78.

If desired a centre guide may be provided for more conveniently locating the work in the machine although it is not absolutely necessary. The guide shown comprises a narrow plate 80 adapted to be mounted in a vertical position on two screws 82 set in the front edge of the work-support, the plate being slotted vertically from its bottom edge to receive the shank of the screws 82. A washer 83 may be arranged on each of the screws 82 between the plate 80 and work-support to afford a space for the passage of the buffer-strip 40 downwardly. On the left side the plate is provided with a bent over triangular portion 84 having its perpendicular edge 85 located on the central axis of the machine, which edge thereby facilitates the centralizing of the work.

In the use of my invention, the gauge is first adjusted in proper position on the work-support with the pins 63 in the proper holes 65 and the appropriate screws 76 are tightened up, holding it securely in position. The work is then inserted between the gauge and the work-support, the upwardly bent forward portion and edge of the gauge facilitating this operation, and is then arranged in relation to the gauge. It is customary before the perforating operation to provide the work with certain small marks or pricks to guide the operator in placing the work in the machine. In Figure 3, a half-vamp 90 is shown as having been perforated with a sweep line design 91 and a centre design 92. On the extreme toe portion the vamp 90 is provided with a central mark or prick 93 and on either side near each end of the sweep line design with another mark, or prick, 94. In gauging the work the operator places it so that the central mark 93 is on a line with the central notch 62 in the edge 61 (in which operation the edge 85 may prove helpful) and the two marks 94 are just visible over the guiding edge 61. In performing this work, the operator generally uses both hands, the position of the right hand being shown in broken lines in Figure 3, as gripping the work between the thumb and forefinger, the other fingers being placed against the right guard to steady the hand. The left hand may be used in a similar manner.

It will be observed that a gauge made in accordance with my invention may be easily and expeditiously applied to or removed from the machine and that its use speeds up the work by enabling the operator to insert the work in the machine and locate it in proper position with great rapidity.

It is also to be understood that my invention is not to be limited to the particular construction herein shown and described since it may be embodied in various other forms for application to perforating machines of varied construction all within the purview of the following claims.

What I claim is:—

1. A gauge for perforating machines comprising a plate having a curved guiding edge and having its forward edge bent upwardly to facilitate the insertion of the work underneath and means for detachably securing said plate in an operative position.

2. A gauge for perforating machines having, in combination, a body portion provided with a sweep-line guiding edge and having its forward portion bent upwardly to facilitate the introduction of work underneath, a pair of tongues for holding down a buffer strip, and means on said body portion for holding it above the work support of the machine.

3. A gauge for perforating machines having, in combination, a body portion provided with a sweep-line guiding edge and having its forward edge bent upwardly to facilitate the insertion of work beneath it, a pair of inwardly projecting tongues on the rear edge of said body-portion for holding down a buffer strip, and means on said body portion for holding it above the work-support of the perforating machine when mounted thereon.

4. A gauge for perforating machines having, in combination, a body portion provided with a sweep-line guiding edge and with means for holding it above the work-support of the machine when mounted thereon, means for holding down a buffer strip and means for protecting the fingers of the operator from injury when holding the work.

5. A gauge for perforating machines having, in combination, a body portion provided with a guiding edge for positioning the work and with depending pins adapted to engage suitable holes in the work-support, said pins carrying means for holding said body portion a sufficient distance above the work-support to permit work to be inserted thereunder, and means for holding down a buffer-strip.

6. In a perforating machine, the combination with a work-support provided with suitable pin-holes and with means for fastening pins when inserted in said holes of a gauge having a body portion provided with a guiding edge and with two depending pins mounted in the said pin-holes in said work-support, said pins being provided with means for holding said gauge a sufficient distance above said work-support to permit work to be freely inserted between the two.

7. In a perforating machine, the combination of a work-support, a gauge mounted thereon in position to permit work to be inserted thereunder, said gauge having a guiding edge, means for locking said gauge on said work-support, means for holding down a buffer strip and means for protecting the fingers of the operator from injury while holding the work.

8. In a perforating machine, the combination of a work-support, a gauge mounted thereon in position to permit work to be inserted thereunder, means for locking said gauge on said work-support and a pair of inwardly projecting tongues carried by said gauge for holding down a buffer strip.

9. In a perforating machine, the combination of a work-support, a gauge provided with a guiding edge mounted on said work-support in position to permit work to be inserted thereunder and a pair of upright guards carried by said gauge for protecting the fingers of the operator from injury while holding the work.

In witness whereof, I hereunto set my hand this seventh day of January, 1924.

WILLIAM F. LAUTENSCHLAGER.